(12) United States Patent
Kamatani et al.

(10) Patent No.: US 6,536,203 B2
(45) Date of Patent: Mar. 25, 2003

(54) GAS TURBINE INSTALLATION

(75) Inventors: Tomoaki Kamatani, Fudai (JP);
Yoshifumi Kubo, Takahagi (JP);
Akitaka Tateishi, Hitachinaka (JP);
Katsutoshi Higuma, Takahagi (JP)

(73) Assignee: Hitachi, Ltd., Tokyo (JP)

( * ) Notice: Subject to any disclaimer, the term of this patent is extended or adjusted under 35 U.S.C. 154(b) by 27 days.

(21) Appl. No.: 09/941,750

(22) Filed: Aug. 30, 2001

(65) Prior Publication Data
US 2002/0078677 A1 Jun. 27, 2002

(30) Foreign Application Priority Data

Dec. 26, 2000 (JP) ......................................... 2000-394084

(51) Int. Cl.$^7$ ................................................. F02C 6/18
(52) U.S. Cl. ........................ 60/39.182; 60/797; 122/7 R
(58) Field of Search ............................. 60/39.182, 796, 60/797; 122/7 R, 1 R

(56) References Cited

U.S. PATENT DOCUMENTS

| 5,461,853 | A | * | 10/1995 | Vetterick | 60/39.182 |
| 5,517,822 | A | * | 5/1996 | Haws et al. | 122/1 R |
| 5,946,901 | A | * | 9/1999 | Bauver et al. | 122/7 R |

FOREIGN PATENT DOCUMENTS

| JP | 4-339138 | 11/1992 |
| JP | 11-13416 | 1/1999 |

* cited by examiner

*Primary Examiner*—Michael Koczo
(74) *Attorney, Agent, or Firm*—Mattingly, Stanger & Malur, P.C.

(57) ABSTRACT

A boiler installation supporting frame structure supported by a supporting structural body and a gas turbine frame base are constituted integrally, and a gas turbine device is disposed at upper portion of the integrated type frame structure and at the lower portion thereof a boiler installation is disposed in a three dimensional structure. Thereby, through the three dimensional arrangement of the gas turbine device and the boiler installation, the power generation installation can be disposed in a limited space.

13 Claims, 5 Drawing Sheets

GAS TURBINE INSTALLATION

BACKGROUND OF THE INVENTION

1. Field of the Invention

The present invention relates to a gas turbine installation in which a gas turbine device and a boiler installation are disposed in three dimensional manner.

2. Conventional Art

A conventional gas installation which is intended to reduce installation space thereof and to shorten construction period thereof is, for example, disclosed in JP-A-11-13416 (1999) and JP-A-4-339138 (1992). J-PA-11-13416 (1999) discloses a package type power plant in which a gas turbine, a generator and a steam turbine are carried on a steel plate frame base and a control hydraulic system for the turbine, the generator and the steam turbine, a lubricating oil system, auxiliary machines for cooling water system and for hydrogen gas system, pipings and electric instrumentation apparatuses are accommodated in the inside space of the steel plate frame base. Further, JP-A-4-339138 (1992) discloses a cogeneration machine in which a gas turbine and a generator are formed in vertical type and a boiler, the gas turbine and the generator are disposed in series in vertical direction.

However, JP-A-11-13416 (1999) discloses nowhere how a boiler installation (an exhaust heat recovery boiler) is installed with respect to a gas turbine installation. Further, JP-A-4-331938 (1992) discloses a series and three dimensional arrangement of the boiler, the gas turbine, and the generator in the power plant building, however, which merely discloses the arrangement of these power plant installation machine and apparatus in every floor in the power plant building and requires a large three dimensional height.

SUMMARY OF THE INVENTION

An object of the present invention is to provide a gas turbine installation which permits to reduce a three dimensional installation space for a gas turbine device and a boiler installation.

In order to achieve the above object, the gas turbine installation according to the present invention which comprises a gas turbine frame base on which a gas turbine device is mounted, a boiler installation which utilizes exhaust gas exhausted from the gas turbine device and a boiler installation supporting frame structure supporting the boiler installation is characterized in that the gas turbine frame base is disposed at an upper portion of the boiler installation supporting frame structure.

DESCRIPTION OF THE PREFERRED EMBODIMENTS

Hereinbelow, a gas turbine installation representing an embodiment according to the present invention will be explained with reference to the drawings.

Figure 1:
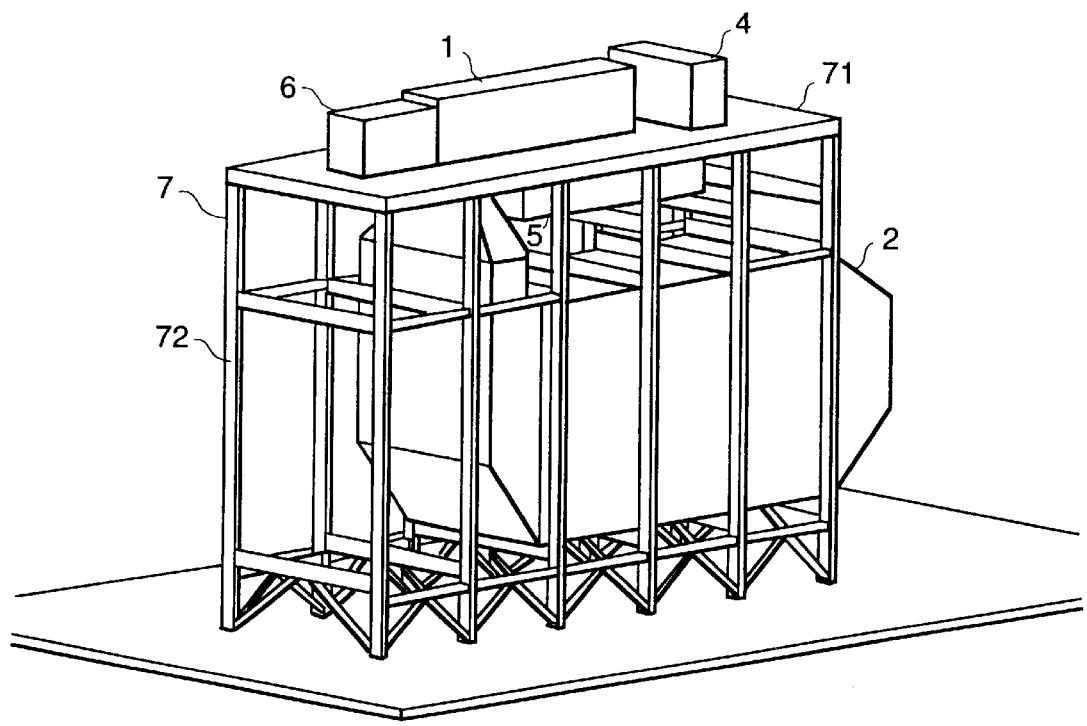
FIG. 1 is a perspective view of a three dimensional type gas turbine power generation installation representing a first embodiment according to the present invention.
Figure 2:
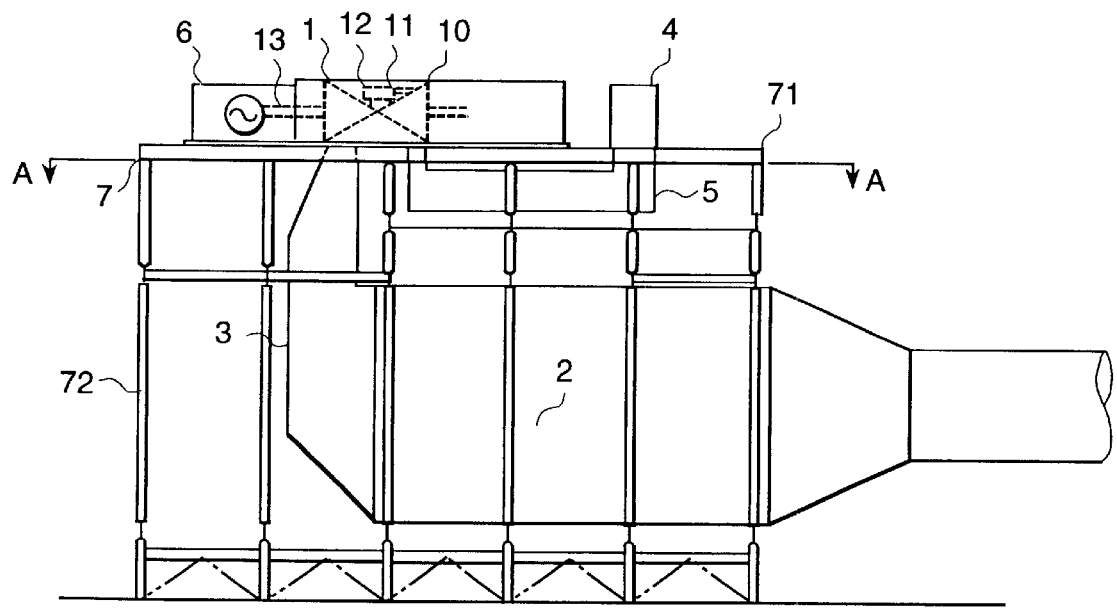
FIG. 2 is a side view of the three dimensional type gas turbine power generation installation as shown in FIG. 1.
Figure 3:
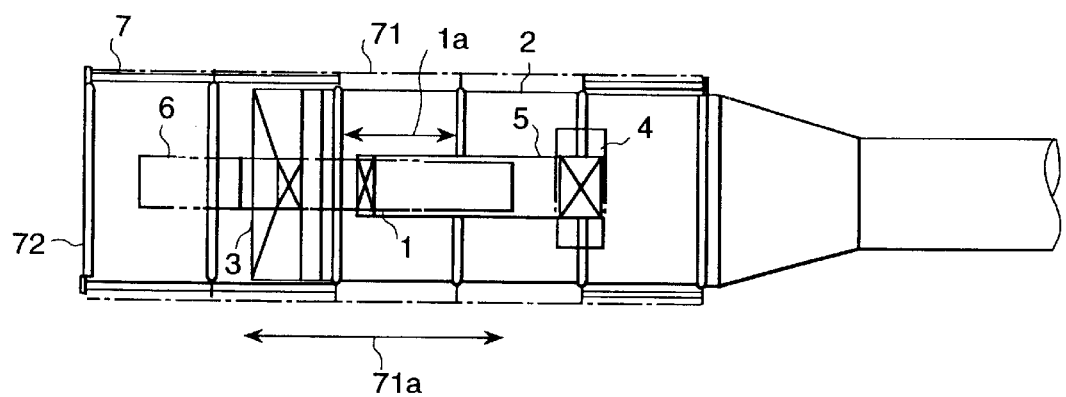
FIG. 3 is a plane view of the three dimensional type gas turbine power generation installation as shown in FIG. 1.
Figure 4:
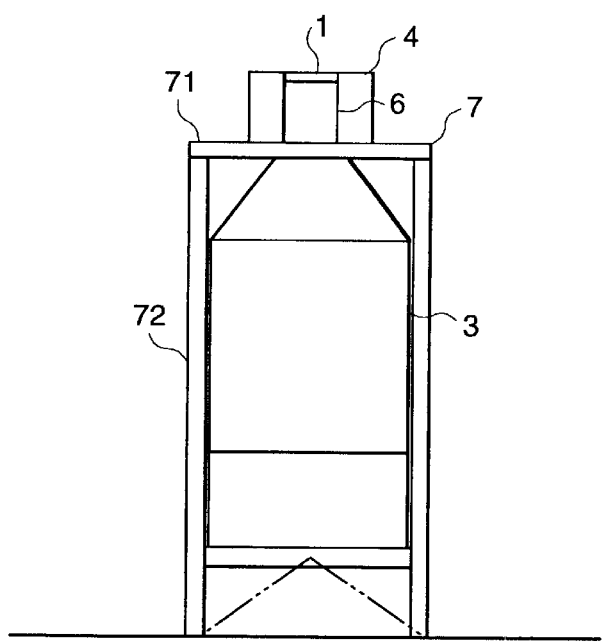
FIG. 4 is a front view of the three dimensional type gas turbine power generation installation as shown in FIG. 1.

FIG. 1 is a perspective view of a three dimensional type gas turbine power generation installation representing a first embodiment according to the present invention, FIG. 2 is a side view of the three dimensional type gas turbine power generation installation as shown in FIG. 1, FIG. 3 is a plane view of the three dimensional type gas turbine power generation installation as shown in FIG. 1, and FIG. 4 is a front view of the three dimensional type gas turbine power generation installation as shown in FIG. 1.

As shown in FIG. 1, the three dimensional type gas turbine installation according to the present embodiment is provided with a gas turbine device 1, a boiler installation (an exhaust heat recovery boiler) 2 which recovers exhaust heat in exhaust gas being exhausted from the gas turbine device 1, an exhaust gas duct 3 which introduces the exhaust gas from the gas turbine device 1 to the boiler installation 2, an air intake chamber 4 which takes in intake air for the gas turbine device 1, an air intake duct 5 which introduce the external air taken in into the air intake chamber 4 to the gas turbine device 1 and a generator 6 driven by the gas turbine device 1. Further, both the gas turbine device 1 and the generator 6 are coupled by a shaft not shown, and the gas turbine device 1, the generator 6 and the air intake chamber 4 which takes in intake air for the gas turbine device 1 are disposed on a frame base 71. Further, the boiler installation 2 is supported by a boiler installation supporting frame structure 72, and the boiler installation supporting frame structure 72 supporting the boiler installation 2 and the gas turbine frame base 71, which is disposed so as to position at the upper portion of the boiler installation 2, are constituted integrally. With an integrated type frame structure 7 constituting in an integral type of the boiler installation supporting frame structure 72 and the gas turbine frame base 71 according to the present embodiment, the gas turbine power generation installation can be disposed in a compact manner.

Now, the detailed structure of the gas turbine installation as shown in FIG. 1 will be explained with reference to FIG. 2 through FIG. 4. At first, on the gas turbine frame base 71 the gas turbine device 1, the generator. 6 and the air intake chamber 4 are disposed. Further, the gas turbine device 1 and the air intake chamber 4 are connected via the air intake duct 5, and the air intake duct 5 is disposed and positioned in a space between the gas turbine frame base 71 and the boiler installation 2. The intake air for the gas turbine device 1 taken-in from the air intake chamber 4 is supplied to an air intake port of the gas turbine device 1 through the air intake duct 5 disposed below the gas turbine frame base 71.

Further, the gas turbine device 1 is constituted by a compressor 10, combustor 11 and a gas turbine 12

(hereinbelow, the compressor 10, the combustor 11 and the gas turbine 12 are inclusively called as a gas turbine device), further, the compressor 10, the gas turbine 12 and the generator 6 are mechanically coupled by a gas turbine shaft 13. Further, an exhaust gas port of the gas turbine device 1 is connected to the boiler installation 2 via an exhaust gas duct 3. The exhaust gas duct 3 is formed so as to extend downward when seen from the gas turbine frame base 71 and is connected to the boiler installation 2 so as to supply gas turbine exhaust gas thereto. Namely, a downward exhaust method is employed in which the exhaust gas duct 3 is connected to the gas turbine device 1 from the bottom and the gas turbine exhaust gas is introduced downward.

In the thus constituted gas turbine device 1, the gas turbine intake air which is at first taken in at the air intake chamber 4 and is introduced via the air intake duct 5 to the gas turbine device 1 is compressed at the compressor 10. Then, the compressed air compressed by the compressor 10 is combusted together with fuel in the combustor 11 to which the fuel is supplied, and the gas turbine 12 is driven the combustion gas generated by the combusting. Further, the mechanical energy generated by the driving of the gas turbine 12 is converted into an electrical energy by the generator 6 coupled via the turbine shaft 13. Further, the gas turbine exhaust gas exhausted from the gas turbine device 1 is supplied to the boiler installation 2 and thereafter, is exhausted to the outside from a chimney not shown.

Further, as shown in FIG. 3 which is a cross sectional view taken along the line A—A in FIG. 2, the air intake duct 5 is positioned at the bottom side of the gas turbine frame base 71, namely, in a space between the gas turbine frame base 71 and the boiler installation 2 and is installed in a region of a projection plane of the gas turbine frame base 71 and the boiler installation 2 when seen from the top. Further, the air intake duct 5 is connected to the gas turbine frame base 71 from the bottom side thereof. Namely, one end of the air intake duct 5 is connected to a portion where a communicating port with the air intake chamber 4 is formed, and the other end thereof is connected to a portion where a communicating port with the air intake port of the gas turbine device 1 is formed. Further, both the gas turbine device 1, the air intake chamber 4 and the generator 6 disposed on the gas turbine frame base 71, and the air intake duct connecting the air intake chamber 4 and the gas turbine device 1 and the exhaust gas duct 3 which supplies the exhaust gas of the gas turbine device 1 to the boiler installation 2 are arranged substantially in a straight line configuration so as to coincide with the axial direction of the gas turbine device 1 and the longitudinal direction of the gas turbine frame base 71.

Further, the gas turbine frame base 71 on which the gas turbine machines and apparatuses are arranged in the same direction as the gas turbine axis direction is also arranged in the same direction as the longitudinal direction of the boiler installation 2. Further, the gas turbine frame base 71 on which the gas turbine machines and apparatuses are arranged as has been explained above is disposed above the boiler installation 2 so that at least a part of the region of a projection plane of the gas turbine frame base 71 and the boiler installation 2 overlaps each other and both longitudinal directions of the gas turbine frame base 71 and the boiler installation 2 coincide each other. Further, the gas turbine frame base 71 is constituted into the integral type structure 7 together with the boiler installation supporting frame structure 72 as shown in FIGS. 2 and 4. Namely, the boiler installation supporting frame structure 72 is also constituted so as to serve as pillars (pillar legs) for the frame base used in a conventional gas turbine frame base. Further, since the boiler installation 2 is disposed inside the frame structure of the integral type frame structure 7, the present embodiment achieves a three dimensional type structure in which the gas turbine device 1 is disposed on the upper portion of the frame structure.

Further, when the present embodiment is for the combined cycle power generation plant which combines a gas turbine and a steam turbine, for example, an exhaust heat recovery boiler which recovers, exhaust heat in the gas turbine exhaust gas and generates team therewith is used as the boiler installation 2. In such instance, the steam generated by the exhaust heat recovery boiler is supplied to a steam turbine installation not shown to be used as steam for driving the steam turbine.

According to the gas turbine installation of the present embodiment, the gas turbine power generation installation and the boiler installation which were conventionally arranged on a same plane are arranged in a three dimensional structure, namely on the upper portion of the boiler installation supporting frame structure 72 which supports the boiler installation 2 as well as accommodates the same inside thereof, the gas turbine frame base 71 is disposed on which the gas turbine device 1 is mounted, thereby, the installation area for the gas turbine power generation installation can be reduced.

Further, in the present embodiment, since the gas turbine frame base 71 and, the boiler installation supporting frame structure 72 are constituted to be integrally connectable, it is possible to integrate the boiler installation supporting frame structure 72 and the gas turbine frame base 71 or to form an integral type package of the boiler installation and the gas turbine installation, thereby, it becomes possible to take a method of delivering and installing the gas turbine installation and the boiler installation in an integral type. Accordingly, in order to realize a power generation installation which satisfies recent extremely severe requirements with regard to site condition and cost reduction, a compactness of the arrangement space, simplification of the exhaust duct laying and shortening of the delivery and installation period can be achieved with the present embodiment.

Further, since the exhaust gas duct 3 is connected to the boiler installation 2 from the bottom side of the gas turbine device 1, the exhaust gas duct can be constituted with easy and shortest route, thereby, the heat recovery rate of the boiler installation 2 is enhanced as well as the thermal efficiency of the entire plant is also enhanced.

Still further, since the boiler installation supporting frame structure and the gas turbine frame base are constituted into an integral structure, it is unnecessitated to constitute the gas turbine frame base by making use of armored concrete as has been required to a conventional plant, thereby, the installation period can be shortened and the production cost can be greatly cut.

Still further, in the present embodiment, since downward air intake method is used in which the air intake duct connecting from the air intake chamber 4 taking in the combustion use air to the gas turbine air compressor is laid under the gas turbine device 1, a space saving of the gas turbine power generation installation including the air intake duct can be achieved. Further, in the downward air intake method there are no machines and apparatuses laying over the gas turbine devices 1, an advantage of excellent maintenance property of the gas turbine device 1 can be achieved.

Still further, in the downward air intake method, since the air intake duct 5 is laid over the boiler installation 2, the diffusion heat of the boiler installation 2 can be introduced to the outer circumference of the air intake duct 5, thereby, snow melting measure can be taken in which snow possibly contained in the intake air in a cold climate site can be melt.

Still further, since the air intake chamber 4 is disposed on the integral type frame structure likely together with the gas turbine device 1, dust suction from the ground surface can be reduced.

Further, according to the present embodiment, when disposing the gas turbine frame base 71 in a three dimensional manner at the upper portion of the boiler installation supporting frame structure 72 which accommodates the boiler installation 2, both longitudinal directions of the gas turbine frame base 71 and the boiler installation 2 are aligned and further both projection planes overlap each other, the space required for the entire power generation installation including the gas turbine device 1 and the boiler installation 2 can be reduced.

Figure 5:
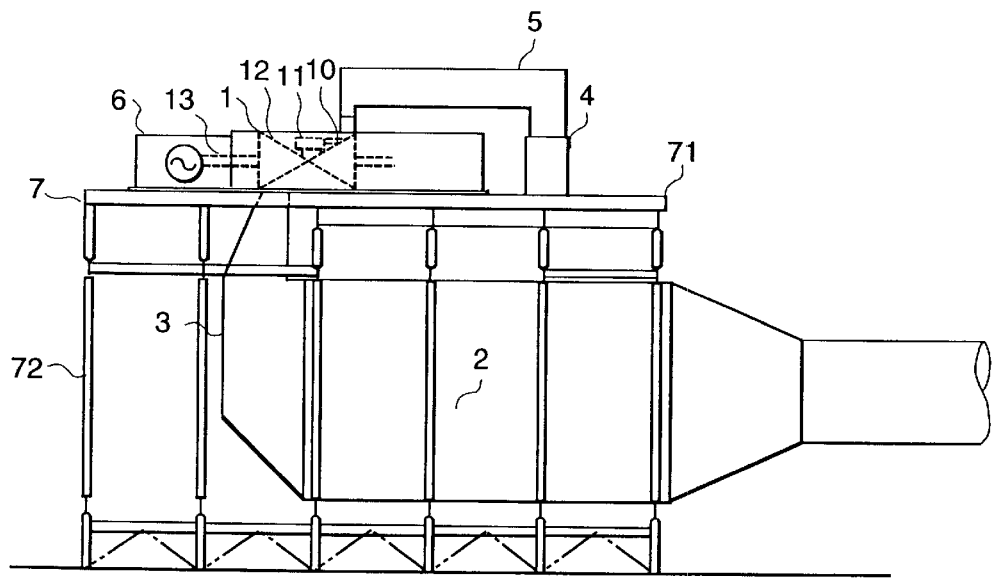
FIG. 5 is a side view of a three dimensional type gas turbine power generation installation representing a second embodiment according to the present invention.

Now, another embodiment according to the present invention will be explained with reference to FIG. 5. Which shows an upward air intake type gas turbine installation in which the air intake duct 5 is disposed at the upper portion of the integrated type frame structure 7 (gas turbine frame base 71). An advantage of the upward air intake type gas turbine installation is that through laying the air intake duct 5 over the gas turbine device 1, the top table height level of the integrated type frame structure 7, in that the installation level of the gas turbine installation can be lowered than that of FIG. 1 embodiment. Through lowering the installation level amount of materials for the integrated type frame structure 7 can be reduced, which accordingly leads to a cost reduction of the installation.

Figure 6:
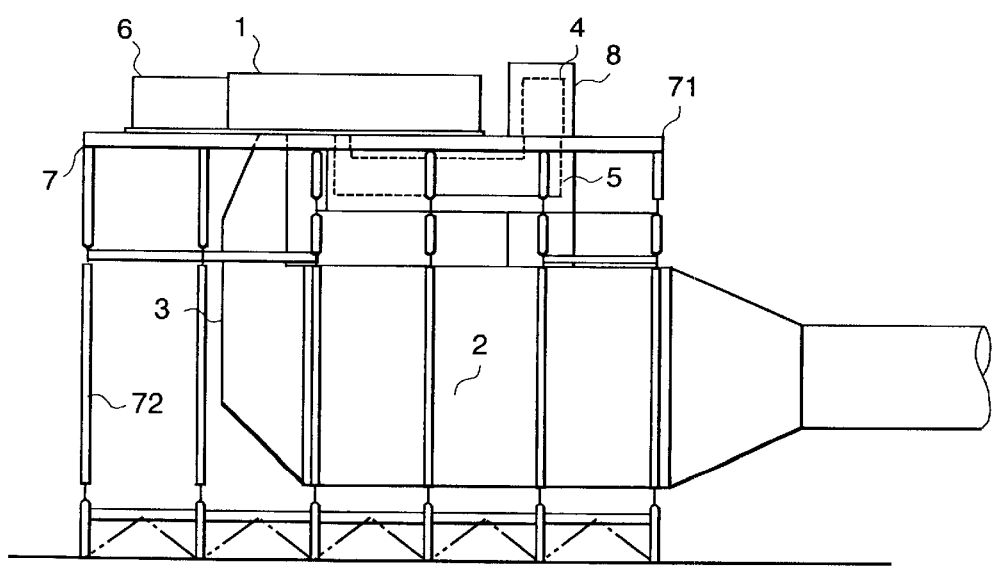
FIG. 6 is a side view of a three dimensional type gas turbine power generation installation representing a third embodiment according to the present invention.
Figure 7:
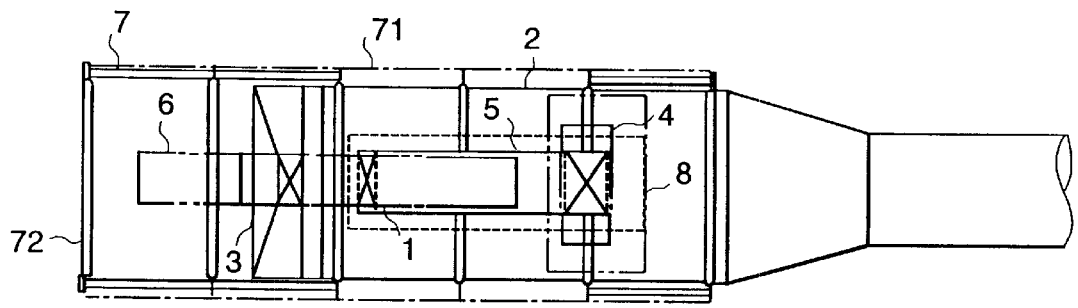
FIG. 7 is a plane view of the three dimensional type gas turbine power generation installation as shown in FIG. 7.

FIGS. 6 and 7 show a gas turbine installation representing still another embodiment according to the present invention. FIG. 6 is a side view of a downward air intake type gas turbine power generation installation with a snowmelt measure, and FIG. 7 shows a plane view of FIG. 6. Hereinbelow, explanation on the same constitutional elements as in the previous embodiments is omitted.

In the present embodiment, the air intake chamber 4 on the integrated type frame structure 7 and the air intake duct 5 disposed between the gas turbine device 1 and the boiler installation 2 are covered by a snowmelt cover 8 as shown in FIGS. 6 and 7, thereby, the radiation heat from the boiler installation 2 can be introduced to the air intake chamber 4 and the air intake duct 5 without varying the physical scale of the installation, and the advantage of snowmelting can be expected.

Further, since the snowmelt countermeasure cover 8 can be constituted by combining a plurality of panels, during high temperature summer time the panels can be removed and during low temperature winter time the panels are combined to constitute the snowmelt countermeasure cover 8, thereby, the performance of the power generation installation can be maintained substantially constant all year around.

Further, by taking advantage of the structural characteristic of the present embodiment that the gas turbine device 1 and the boiler installation 2 are constituted in a three dimensional structure, an exhaust gas recirculation duct which recirculates exhaust gas from the boiler installation to the gas turbine can be easily disposed between the air intake chamber 4 and the exhaust gas duct 3 without increasing the physical scale of the installation, and thereby, an exhaust gas recirculation type gas turbine installation can be easily constituted.

Figure 8:
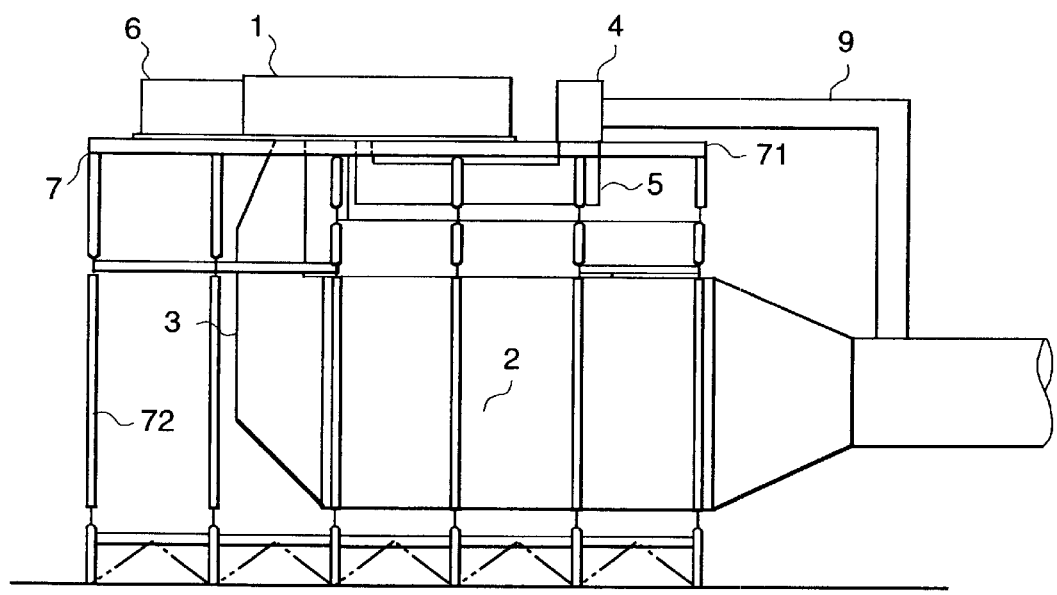
FIG. 8 is a side view of a three dimensional type gas turbine power generation installation representing a fourth embodiment according to the present invention.
Figure 9:
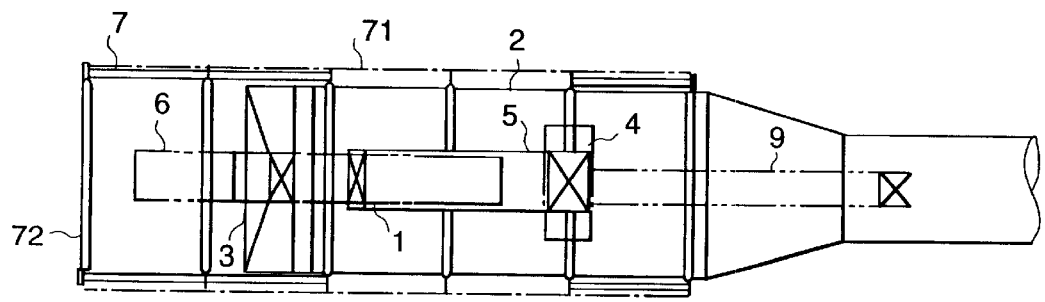
FIG. 9 is a plane view of the three dimensional type gas turbine power generation installation as shown in FIG. 8.

FIGS. 8 and 9 show a gas turbine power generation installation representing a further embodiment. FIG. 8 is a side view of an exhaust gas recirculation type gas turbine power generation installation using downward air intake method, and FIG. 9 shows a plane view of FIG. 8.

In the present embodiment, a duct route is constituted in such a manner that an exhaust gas recirculation duct 9 is connected from the exhaust gas duct at the downstream of the boiler installation 2 to the air intake chamber 4 at the upper portion of the integrated type frame structure 7 so as to mix the recirculated exhaust gas with fresh air and to introduce the same to the gas turbine device 1, thereby, the operation efficiency of the gas turbine is enhanced.

The air intake chamber 4 is designed to take in the combustion use air from three directions and one of them (at upstream side) is used as the inlet port for the recirculated exhaust gas. Such exhaust gas recirculation duct 9 can be provided regardless to the air intake method in that such duct can be provided for the upward air intake mode. Further, the exhaust gas recirculation duct 9 can be connected to the air intake duct 5.

Figure 10:
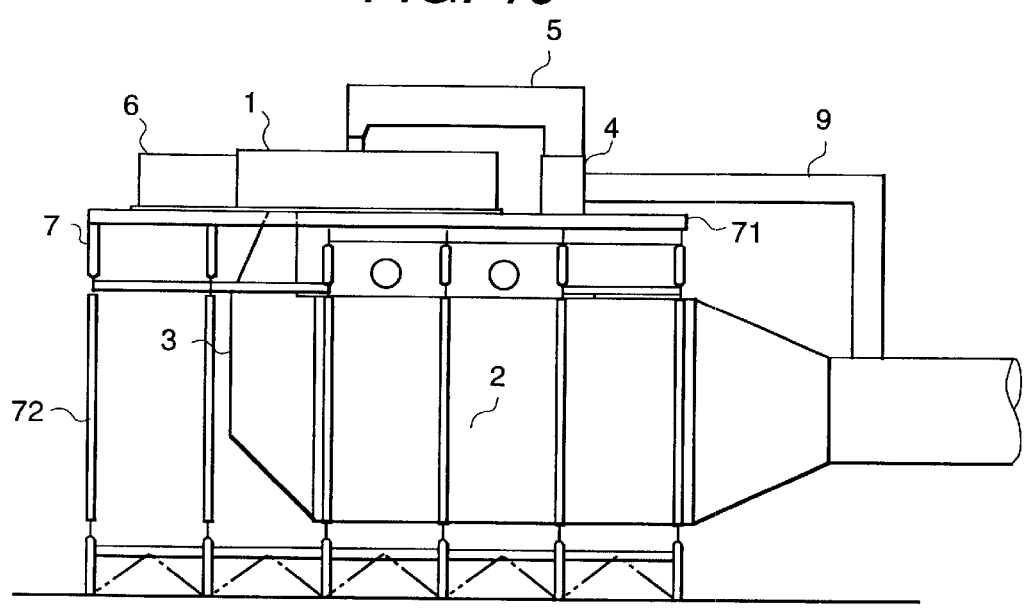
FIG. 10 is a side view of a three dimensional type gas turbine power generation installation representing a fifth embodiment according to the present invention.

FIG. 10 shows an upper air intake mode and exhaust gas recirculation type gas turbine power generation installation.

The present embodiment, is constituted by connecting the exhaust gas recirculation duct 9 to the air intake chamber 4 so as to mix the recirculated exhaust gas with fresh air and to introduce the same to the gas turbine installation 1 like FIGS. 8 and 9 embodiment. Further, the present embodiment shows an advantage of lowering the installation height level of the gas turbine device 1 like FIG. 5 embodiment.

As has been explained hitherto, through the three dimensional type gas turbine power generation installation according to FIG. 1 through FIG. 10 embodiments, the space saved gas turbine power generation installation in comparison with the conventional ones can be provided, and the installation itself can be constructed in a compact structure.

Further, through the integration of the boiler installation supporting frame structure and the gas turbine frame base, both delivery and installation periods thereof are greatly reduced, and the cost reduction therefor can be also achieved. Still Still further, because of the structural characteristic that the gas turbine installation and the boiler installation are disposed in a three dimensional structure, a machine structure which permits to an easy development to the snowmelt type gas turbine installation as shown in FIGS. 6 and 7 and to the exhaust gas recirculation type gas turbine installations as shown in FIGS. 8 through 10 can be obtained without increasing the physical scale of the installations.

According to the present invention, an advantage that a gas turbine installation can be provided of which installation space for a gas turbine device and a boiler installation can be reduced.

What is claimed is:

1. A gas turbine installation which comprises a gas turbine frame base on which a gas turbine device is mounted, a boiler installation which utilizes exhaust gas exhausted from the gas turbine device and a boiler installation supporting frame structure supporting the boiler installation, characterized in that the gas turbine frame base is disposed at the upper portion of the boiler installation supporting frame structure.

2. A gas turbine installation which comprises a gas turbine frame base on which a gas turbine device is mounted, a boiler installation which recovers exhaust heat of exhaust gas from the gas turbine device and a boiler installation supporting frame structure supporting the boiler installation, characterized in that the gas turbine frame base is disposed at the upper portion of the boiler installation supporting frame structure in which inner space the boiler installation is disposed, and the boiler installation supporting frame structure is constituted to serve as pillar legs for supporting the gas turbine frame base.

3. A gas turbine power generation installation which comprises a gas turbine frame base on which a gas turbine device is mounted, a boiler installation which recovers exhaust heat of exhaust gas from the gas turbine device and a boiler installation supporting frame structure supporting the boiler installation, characterized in that the boiler installation is disposed in an inner space of the boiler installation supporting frame structure and the boiler installation supporting frame structure is disposed below the gas turbine frame base.

4. A gas turbine installation comprising: a gas turbine device, a gas turbine frame base at the upper portion of which the gas turbine device is mounted, an air intake chamber which is disposed on the gas turbine frame base and takes in air for the gas turbine device, an air intake duct which introduces air taken in at the air intake chamber into the gas turbine device, a boiler installation which recovers exhaust heat of exhaust gas exhausted from the gas turbine device, an exhaust gas duct which introduces the exhaust gas from the gas turbine device to the boiler installation and a boiler installation supporting frame structure for supporting the boiler installation, wherein the gas turbine frame base is disposed at the upper portion of the boiler installation supporting frame structure in an inner space of which the boiler installation is disposed in such a manner to have an overlapping region of projection planes of the gas turbine frame base and the boiler installation, and the boiler installation supporting frame structure and the gas turbine frame base are constituted so as to permit an integral connection.

5. A gas turbine installation comprising: a gas turbine device, a gas turbine frame base at the upper portion of which the gas turbine device is mounted, an air intake chamber which is disposed on the gas turbine frame base and takes in air for the gas turbine device, an air intake duct which introduces air taken in at the air intake chamber into the gas turbine device, a boiler installation which recovers exhaust heat of exhaust gas exhausted from the gas turbine device, an exhaust gas duct which introduces the exhaust gas from the gas turbine device to the boiler installation and a boiler installation supporting frame structure for supporting the boiler installation, wherein the gas turbine frame base is disposed at the upper portion of the boiler installation supporting frame structure in an inner space of which the boiler installation is disposed in such a manner to have an overlapping region of projection planes of the gas turbine frame base and the boiler installation, and the boiler installation and the gas turbine frame base are disposed so that the longitudinal directions thereof align each other.

6. A gas turbine installation according to claim 4, characterized in that the exhaust gas duct is constituted so as to extend downward from the gas turbine frame base, and is connected to the boiler installation.

7. A gas turbine installation according to claim 5, characterized in that the exhaust gas duct is constituted so as to extend downward from the gas turbine frame base, and is connected to the boiler installation.

8. A gas turbine installation according to claim 4, characterized in that the air intake duct is positioned below the gas turbine frame base and above the boiler installation, and one end of the air intake duct is connected to a portion of the gas turbine frame base communicating with the air intake chamber and the other end thereof is connected to another portion of the gas turbine frame base communicating with an air intake port of the gas turbine device.

9. A gas turbine installation according to claim 5, characterized in that the air intake duct is positioned below the gas turbine frame base and above the boiler installation, and one end of the air intake duct is connected to a portion of the gas turbine frame base communicating with the air intake chamber and the other end thereof is connected to another portion of the gas turbine frame base communicating with an air intake port of the gas turbine device.

10. A gas turbine installation according to claim 4, characterized in that the gas turbine installation is further provided with an exhaust gas recirculation duct which recirculates a part of exhaust gas of the boiler installation into the air intake chamber or the air intake duct.

11. A gas turbine installation according to claim 5, characterized in that the gas turbine installation is further provided with an exhaust gas recirculation duct which recirculates a part of exhaust gas of the boiler installation into the air intake chamber or the air intake duct.

12. A combined cycle power generation installation comprising: a gas turbine frame base on which a gas turbine device is mounted, an exhaust heat recovery boiler which recovers exhaust heat of exhaust gas exhausted from the gas turbine device and generates steam therewith, a boiler installation supporting frame structure which supports the exhaust heat recovery boiler and a steam turbine installation which is driven by the steam generated by the exhaust heat recovery boiler, characterized in that the gas turbine frame base is disposed at the upper portion of the boiler installation supporting frame structure.

13. A combined cycle power generation installation comprising: a gas turbine frame base on which a gas turbine device is mounted, an exhaust heat recovery boiler which recovers exhaust heat of exhaust gas exhausted from the gas turbine device and generates steam therewith, a boiler installation supporting frame structure which supports the exhaust heat recovery boiler and a steam turbine installation which is driven by the steam generated by the exhaust heat recovery boiler, characterized in that, the gas turbine frame base is disposed at the upper portion of the boiler installation supporting frame structure in an inner space of which the exhaust heat recovery boiler is disposed in such a manner to have an overlapping region of projection planes of the gas turbine frame base and the exhaust heat recovery boiler, and the boiler installation supporting frame structure and the gas turbine frame base are constituted so as to permit an integral connection.

* * * * *